United States Patent
Batchu et al.

(10) Patent No.: US 9,014,071 B2
(45) Date of Patent: Apr. 21, 2015

(54) APPARATUS AND METHOD FOR AVOIDING SYSTEM LOSSES FOR M2M DEVICES OPERATING AT LONGER SLOT CYCLE

(71) Applicant: QUALCOMM Incorporated, San Diego, CA (US)

(72) Inventors: Bhaskara V. Batchu, Hyderabad (IN); Aditya Bohra, Hyderabad (IN); Anand Rajurkar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 13/744,040

(22) Filed: Jan. 17, 2013

(65) Prior Publication Data

US 2014/0198695 A1     Jul. 17, 2014

(51) Int. Cl.
G08C 17/00 (2006.01)
H04W 52/02 (2009.01)
H04W 4/00 (2009.01)

(52) U.S. Cl.
CPC .......... *H04W 52/0229* (2013.01); *H04W 4/005* (2013.01)

(58) Field of Classification Search
None
See application file for complete search history.

(56) References Cited

U.S. PATENT DOCUMENTS

| | | | |
|---|---|---|---|
| 5,790,589 A | 8/1998 | Hutchison, IV et al. | |
| 6,212,398 B1* | 4/2001 | Roberts et al. | 455/502 |
| 6,289,228 B1 | 9/2001 | Rotstein et al. | |
| 7,123,601 B2 | 10/2006 | He et al. | |
| 2003/0103479 A1* | 6/2003 | Anderson et al. | 370/335 |
| 2004/0176147 A1* | 9/2004 | Escalante | 455/574 |
| 2008/0309490 A1 | 12/2008 | Honkanen et al. | |
| 2009/0247170 A1 | 10/2009 | Balasubramanian et al. | |
| 2010/0091643 A1 | 4/2010 | Tu et al. | |
| 2011/0280221 A1* | 11/2011 | Chin et al. | 370/335 |
| 2012/0100845 A1 | 4/2012 | Mildh et al. | |

FOREIGN PATENT DOCUMENTS

| | | |
|---|---|---|
| WO | WO-9948221 A1 | 9/1999 |
| WO | WO-0033594 A1 | 6/2000 |
| WO | WO-02098009 A1 | 12/2002 |

OTHER PUBLICATIONS

International Search Report and Written Opinion—PCT/US2014/010148—ISA/EPO—Apr. 29, 2014.

* cited by examiner

*Primary Examiner* — Andrew Chriss
*Assistant Examiner* — Voster Preval
(74) *Attorney, Agent, or Firm* — Loza & Loza LLP

(57) ABSTRACT

Aspects of the present disclosure are directed to an apparatus and methods capable of pre-correcting reacquisition slew of pilot signal timing when a mobile device operates in a slotted mode or discontinuous reception (DRX) mode. In one aspect, a mobile device is operated in slotted mode. The mobile device wakes up to perform a pilot reacquisition corresponding to a slotted mode and detects a slew of a pilot timing relative to a pilot reference timing. The mobile device adjusts a subsequent pilot reference timing by an amount corresponding to the detected slew, to be utilized during a subsequent wake-up cycle. The mobile device returns to a sleep state to wait for the subsequent wake-up cycle. Other aspects, embodiments, and features are also claimed and described.

36 Claims, 8 Drawing Sheets

APPARATUS AND METHOD FOR AVOIDING SYSTEM LOSSES FOR M2M DEVICES OPERATING AT LONGER SLOT CYCLE

TECHNICAL FIELD

The technology discussed in this patent application relates generally to wireless communication systems, and more particularly, to machine-to-machine (M2M) devices operating in a slotted mode. Embodiments of the present invention enable efficient use of power resources when acquiring contact with network resources.

BACKGROUND

Wireless communications systems are widely deployed to provide various types of communication content such as voice, video, packet data, messaging, broadcast, and so on. These systems may be accessed by various types of mobile devices (e.g., access terminals) adapted to facilitate wireless communications, where multiple access terminals share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

In several different wireless communication technologies, a power-saving technique called discontinuous reception (DRX) or a slotted mode may be used. In DRX, a mobile device (e.g., an access terminal, sometimes called a mobile station or user equipment) goes to sleep by turning off certain relatively power-intensive circuitry, and periodically wakes up to look for information transmitted at the appropriate times. In slotted mode, the mobile device monitors those time slots that are assigned to it. In CDMA, for example, the mobile device wakes up according to a slot cycle index (SCI) for decoding mobile terminated directed messages during the assigned slot or for performing registrations.

A larger SCI value increases the time duration between wake-up periods. During slotted mode operation, the mobile device may wake up and determine reacquisition slew (drift in pilot timing) by searching the strongest pilot path using an active set window with a suitable size (e.g., ASET_WIN_SIZ). In certain category of mobile-to-mobile (M2M) devices, a M2M device may operate with higher SCI values. Therefore, the M2M device may be configured to have longer registration time duration in order to restrict the frequency of network access. However, if the SCI value is too large, the M2M device may fail to reacquire the system when the reacquisition slew becomes too large due to long wake-up cycle.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure are directed to an apparatus and methods capable of pre-correcting predicted reacquisition slew of pilot signal timing when a mobile device operates in a slotted mode or discontinuous reception (DRX) mode. In one aspect, when a mobile device is operated in the slotted mode, the mobile device wakes up to perform a pilot reacquisition and detects a slew of a pilot timing relative to a pilot reference timing. Then, the mobile device adjusts a subsequent pilot reference timing by an amount corresponding to the detected slew, and the subsequent pilot reference timing is utilized during a subsequent wake-up cycle.

In one aspect, the disclosure provides a method of wireless communication operable at a mobile device. The method includes waking up to perform a pilot reacquisition corresponding to a slotted mode; detecting a slew of a pilot timing relative to a pilot reference timing; adjusting a subsequent pilot reference timing by an amount corresponding to the detected slew, to be utilized during a subsequent wake-up cycle; and returning to a sleep state to wait for the subsequent wake-up cycle.

Another aspect of the disclosure provides and apparatus for wireless communication. The apparatus includes means for waking up to perform a pilot reacquisition corresponding to a slotted mode; means for detecting a slew of a pilot timing relative to a pilot reference timing; means for adjusting a subsequent pilot reference timing by an amount corresponding to the detected slew, to be utilized during a subsequent wake-up cycle; and means for returning to a sleep state to wait for the subsequent wake-up cycle.

Another aspect of the disclosure provides a computer program product including a computer-readable storage medium. The computer-readable storage medium includes code for causing a mobile device to: wake up to perform a pilot reacquisition corresponding to a slotted mode; detect a slew of a pilot timing relative to a pilot reference timing; adjust a subsequent pilot reference timing by an amount corresponding to the detected slew, to be utilized during a subsequent wake-up cycle; and return to a sleep state to wait for the subsequent wake-up cycle.

Another aspect of the disclosure provides an apparatus for wireless communication. The apparatus includes at least one processor, a communication interface coupled to the at least one processor, and a memory coupled to the at least one processor. The at least one processor is configured to: wake up to perform a pilot reacquisition corresponding to a slotted mode; detect a slew of a pilot timing relative to a pilot reference timing; adjust a subsequent pilot reference timing by an amount corresponding to the detected slew, to be utilized during a subsequent wake-up cycle; and return to a sleep state to wait for the subsequent wake-up cycle.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Aspects of the present disclosure are directed to an apparatus and methods for pre-correcting reacquisition slew of pilot signal timing when the apparatus (e.g., mobile device, access terminal, mobile station, or user equipment) operates in a slotted mode or discontinuous reception (DRX) mode.

Figure 1:
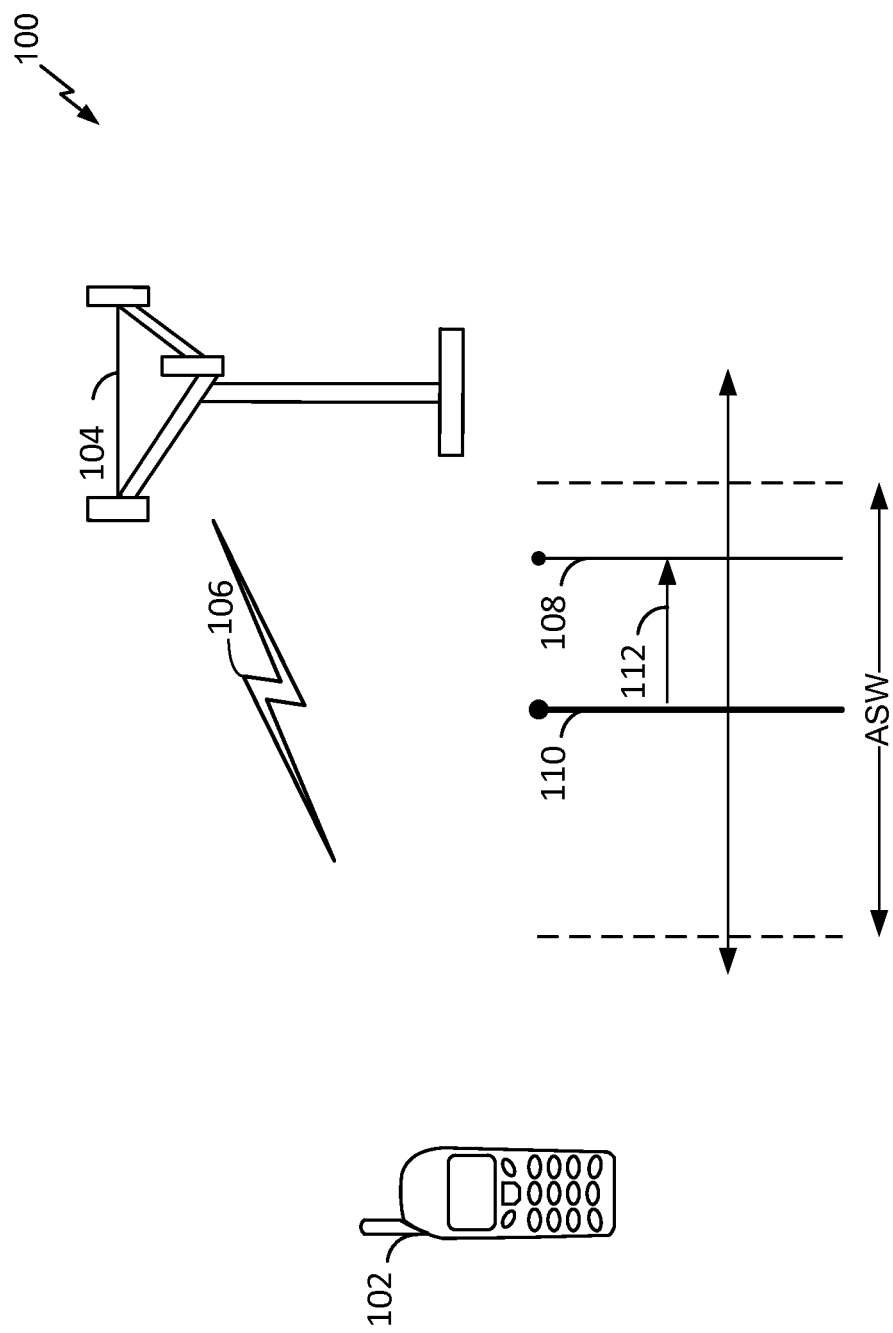
FIG. 1 is a diagram conceptually illustrating a wireless communications system in which a mobile device is capable of communicating with a base station in slotted mode according to some embodiments.

The various concepts presented throughout this disclosure may be implemented across a broad variety of telecommunication systems, network architectures, and communication standards. FIG. 1 is a conceptual diagram illustrating a wireless 102 is capable of communicating with a base station 104 in slotted mode, according to an aspect of the disclosure. In cdma2000 technology, for example, a mobile device configured for the slotted mode generally wakes up periodically in a slot cycle that is determined based on a slot cycle index (SCI) assigned by the network. In current standards, the SCI value can vary from 0 to 7, and the time duration between wake-ups is calculated based on this SCI value.

The SCI is a setting that controls the length of a slot. The slot (in seconds) may be determined as follows:

$$Slot = 1.28 \times 2^{SCI}$$

For example, for SCI=0 (slot cycle 0), the slot is 1.28 seconds. For SCI=1 (slot cycle 1), the slot is 2.56 seconds. For SCI=2 (slot cycle 2), the slot is 5.12 seconds. The longest slot cycle corresponds to SCI=7, and the slot is 163.84 seconds.

The slot cycle is generally controlled by the cell. With a short slot cycle, the mobile device 102 gets more chances to receive a page before the call is routed to voice mail. However, the mobile device 102 may consume more power, so standby time may be reduced. Furthermore, the paging channel may have less capacity. A longer slot cycle provides more capacity on the paging channel and lengthens standby time; however, the mobile device 102 has fewer opportunities to receive a page, so that the mobile device is more likely to miss a page.

When the mobile device 102 wakes up, it re-acquires a suitable pilot transmitted by a nearby base station 104 to camp on the system. To find a suitable pilot, the mobile device 102 generally scans pilots transmitted from the cells identified in its active set (a set of cells currently active from the point of view of the mobile device) and its neighbor set (a set of cells neighboring the most recent serving cell). For example, the mobile device 102 may receive a pilot signal 106 from the base station 104. When the mobile device 102 scans for pilots within the active set, it utilizes a suitable active set window (ASW), which is duration of time for the scan, usually measured in a number of chips. Here, the value of the duration of the ASW is generally received from the network in the system parameters message (SPM).

One issue with slotted mode reacquisition relates to reacquisition slew. That is, for various reasons, the pilot timing 108 relative to that of a previously acquired strongest pilot (referred to as Mobile Pilot Reference Time (MPRT) 110) can drift from wake-up cycle to wake-up cycle. This drift is referred to as the reacquisition slew 112. When the reacquisition slew 112 falls within the ASW centered at the MPRT 110, the MPRT 110 can be corrected; however, if a reacquisition slew falls outside the ASW, the mobile device 102 may to lose the system. When the SCI used by the mobile device 102 is large (e.g., >2), meaning that the time duration between wake-up cycles is relatively long, the slew 112 is more likely to become large enough to begin to cause problems with reacquisition. In particular, machine-type communication (MTC) or M2M devices such as smart meters or remote sensors frequently utilize a large SCI because their responsiveness to page messages is not as critical as other devices. Thus, with these devices, the probability of losing the pilot timing and failing the standard reacquisition is relatively high. When this occurs, the device is required to re-acquire the pilot from the beginning, consuming more power than desired.

Figure 2:
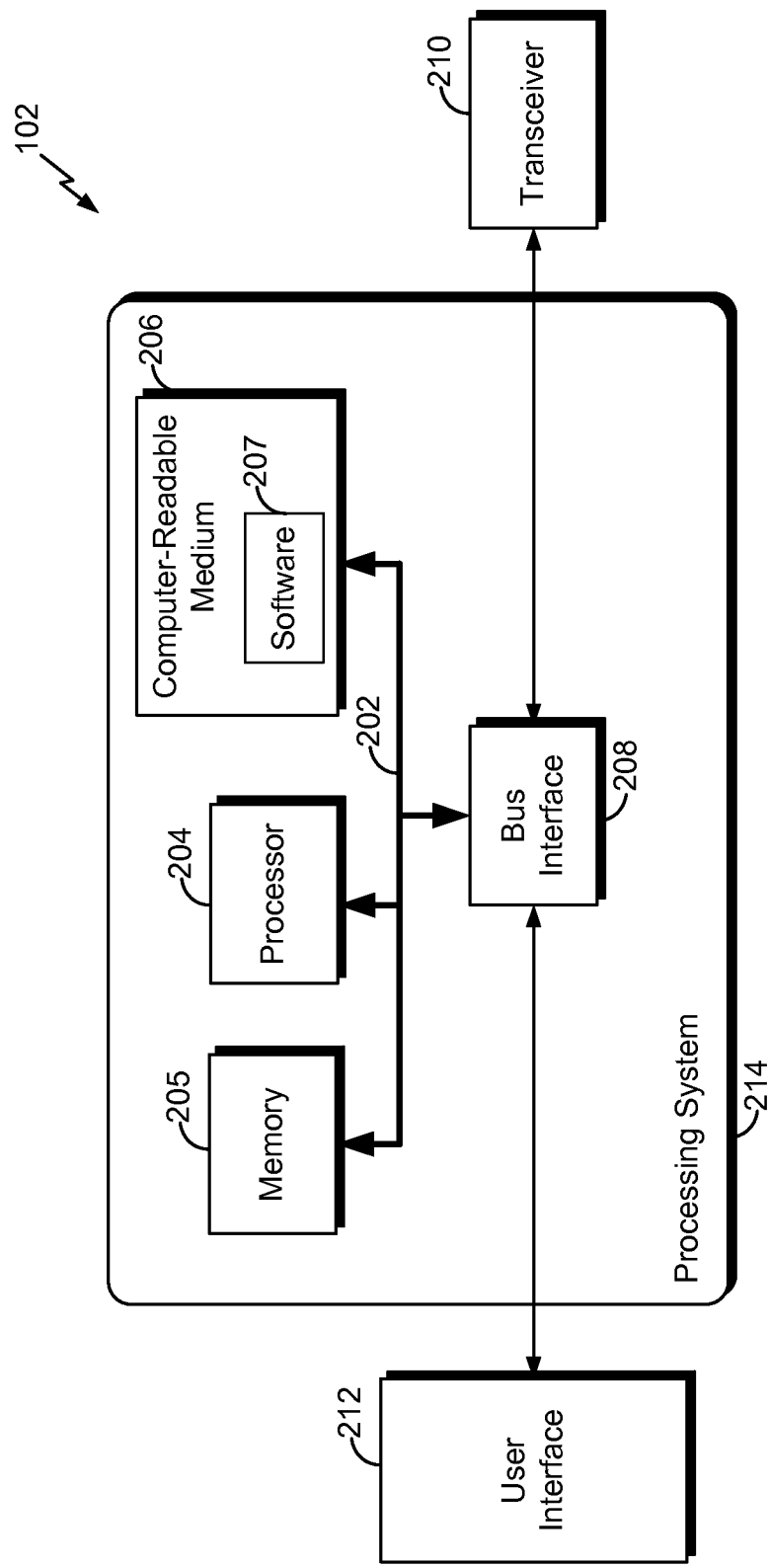
FIG. 2 is a diagram conceptually illustrating an example of a hardware implementation for the mobile device of FIG. 1 employing a processing system according to some embodiments.

FIG. 2 is a conceptual diagram illustrating an example of a hardware implementation for the mobile device 102 employing a processing system 214. In accordance with various aspects of the disclosure, the processing system 214 may include one or more processors 204. Examples of processors 204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 214 may be implemented with a bus architecture, represented generally by a bus 202. The bus 202 may include any number of interconnecting buses and bridges depending on the specific application of the processing system 214 and the overall design constraints. The bus 202 links together various circuits including one or more processors (represented generally by the processor 204), a memory 205, and computer-readable media (represented generally by the computer-readable medium 206). The computer-readable media 206 may contain code or software that when executed by the processing system 214 implements the processes and procedures described herein. The bus 202 may also link various other circuits such as timing sources, peripherals, voltage regulators, and power management circuits, which are well known in the art, and therefore, will not be described any further. A bus interface 208 provides an interface between the bus 202 and a transceiver 210. The transceiver 210 provides a means for communicating with various other apparatus (e.g., base station 104) over a transmission medium. In addition, the mobile device 102 may include a user interface 212 (e.g., keypad, display, speaker, microphone, joystick, etc.).

The processor 204 is responsible for managing the bus 202 and general processing, including the execution of software or core stored on the computer-readable medium 206. The software, when executed by the processor 204, causes the processing system 214 to perform the various functions described infra for any particular apparatus (e.g., the mobile device 102). The computer-readable medium 206 may also be used for storing data that is manipulated by the processor 204 when executing software.

One or more processors 204 in the processing system may execute software 207. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. For example, the software 207 may include code when executed by the processor that causes the mobile device 102 to perform procedures to adjust a subsequent pilot timing reference timing to pre-correct a predicted slew of pilot timing. The software 207 may reside on the computer-readable medium 206. The computer-readable medium 206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 206 may reside in the processing system 214, external to the processing system 214, or distributed across multiple entities including the processing system 214. The computer-readable medium 206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 3:
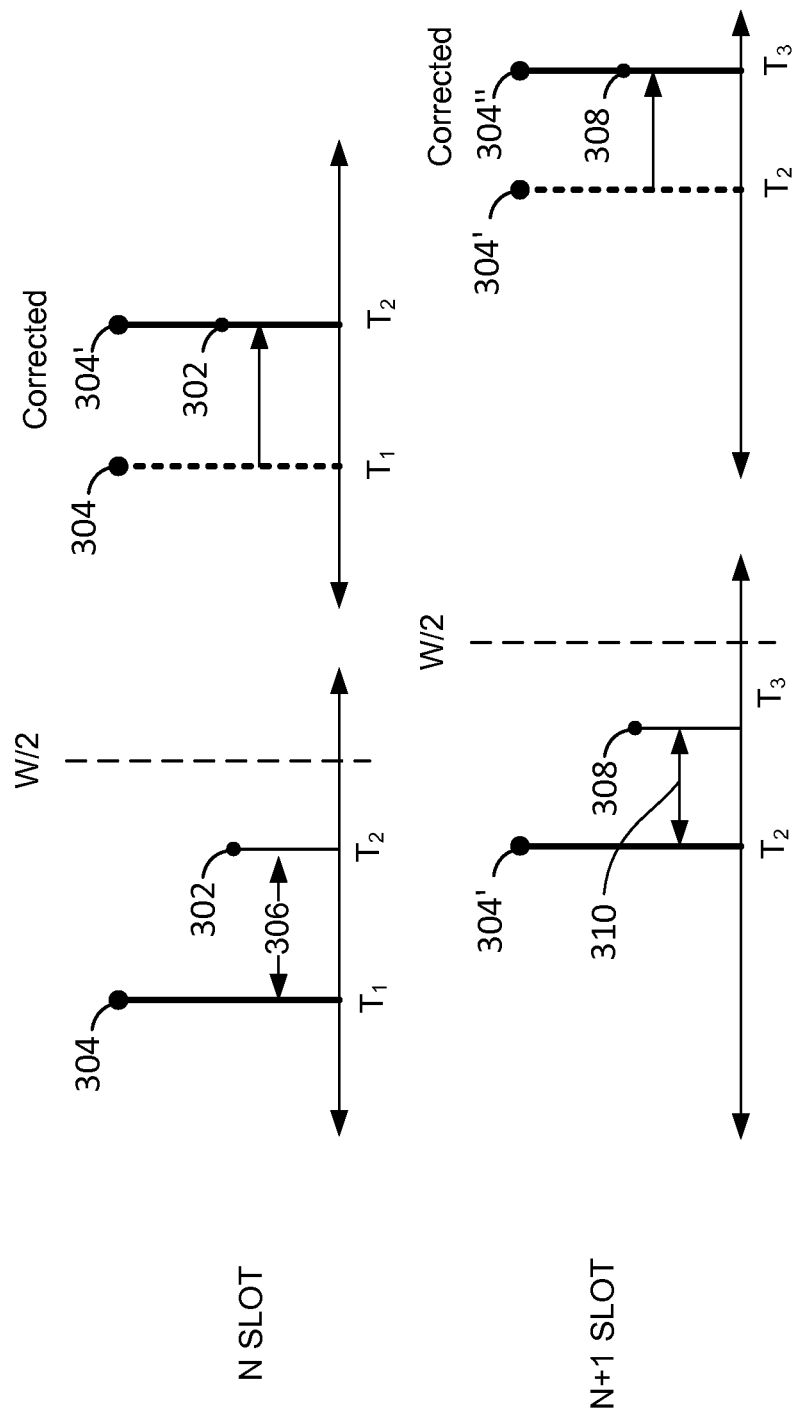
FIG. 3 is a diagram illustrating mobile pilot reference timing adjustment in accordance with some embodiments.

FIG. 3 is a diagram illustrating mobile pilot reference timing adjustment in accordance with one aspect of the disclosure. In an N slot, a mobile device 102 wakes up and detects an actual pilot timing 302 in relation to a mobile pilot reference timing (MPRT) 304 using a suitable reacquisition window centered at the MPRT 304. In the N slot, the MPRT 304 may have a value of $T_1$, and the detected pilot timing 302 may have a value of $T_2$, which is between $T_1$ and one half the size (W/2) of the reacquisition window. Here, the reacquisition slew 306 of the pilot timing is the difference between $T_1$ and $T_2$. Accordingly, before the mobile device 102 goes back to sleep or a low-power mode, it may reduce or correct the slew 306 by adjusting the MPRT 304 to be substantially equal to the detected pilot timing $T_2$. That is, a subsequent MPRT 304' may be pre-corrected by being moved or shifted in the direction of the actual pilot timing 302. In an N+1 slot, the mobile device 102 wakes up again and detects an actual pilot timing 308 using a suitable search window centered at the pre-corrected MPRT 304'. Initially, in slot N+1, the MPRT 304' has a value of $T_2$, and the detected pilot timing 308 has a value of $T_3$. Here, a slew 310 of the pilot timing is the difference between $T_2$ and $T_3$. Accordingly, the mobile device 102 may reduce or correct the slew 310 by adjusting a subsequent MPRT 304", for example, to be substantially equal to the actual pilot timing $T_3$. However, the disclosure is not limited to correcting a MPRT to be equal to the detected pilot timing. In some aspects, a subsequent MPRT 304 may be pre-corrected based on a detected slew in different ways, infra.

According to aspects of the disclosure, the pilot reference timing may be pre-corrected or adjusted during a current wake-up slot in such a way that when a mobile device 102 wakes up during the next wake-up slot, the observed slew is likely to fall within the range of detectable strong pilot paths. Thus, frequent system losses caused by large slew may be avoided when higher SCI values are used for M2M devices. In some aspects, pre-correcting the pilot reference timing may be implemented by shifting the value of the pilot reference timing by an amount dependent on the magnitude and or vector direction of the slew detected in the current wake-up cycle. Thus, a pilot search window center is shifted in the direction of the current observed slew, with an estimated value corresponding to the slew. The pre-correction of the mobile pilot reference timing is performed before the mobile device 102 returns to sleep. With the pre-correction of the pilot reference timing, it is more likely that the observed slew in the next wake-up slot will lie within the range detectable by a pilot search window.

Figure 4:
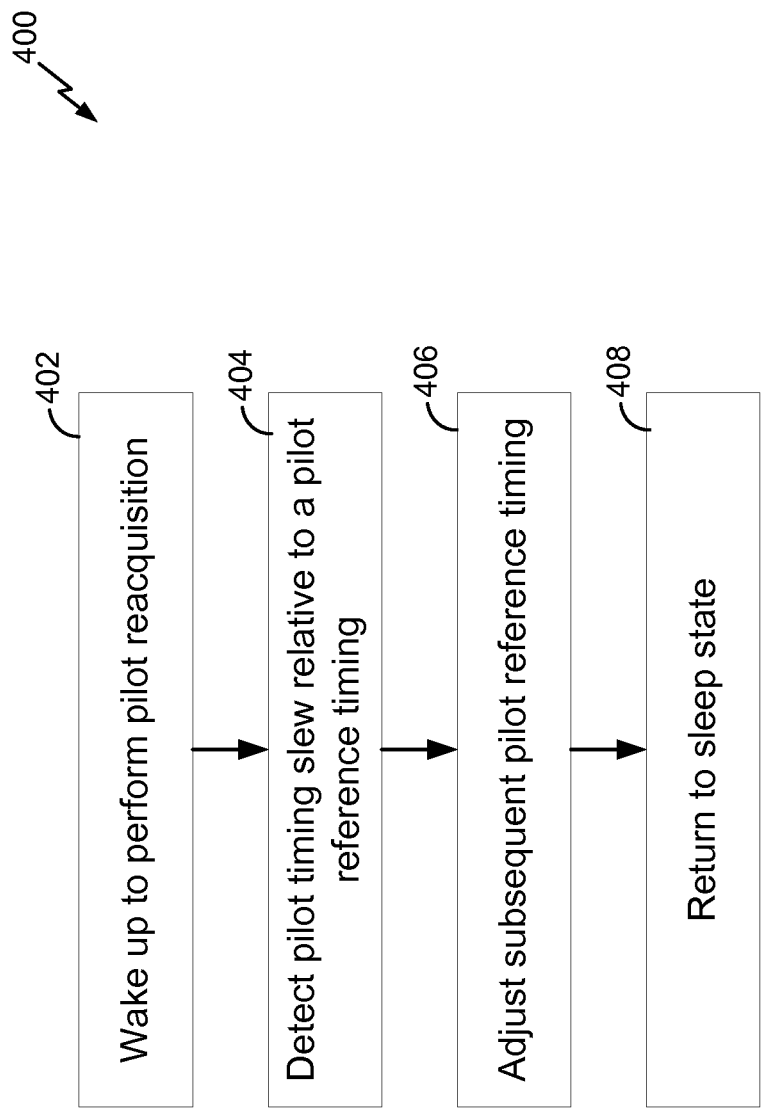
FIG. 4 is a block diagram illustrating pre-correction of mobile pilot reference timing according to some embodiments.

FIG. 4 is a block diagram 400 illustrating pre-correction of mobile pilot reference timing according to aspects of the disclosure. In 402, a mobile device 102 wakes up during an assigned slot to perform pilot reacquisition corresponding to a slotted mode. A suitable reacquisition window may be used to reacquire a pilot signal. For example, the mobile device 102 may acquire a pilot timing 302 from a base station 104 based on a mobile pilot reference time 304. In 404, the mobile device 102 detects an acquisition slew of the actual pilot timing 302 relative to the mobile pilot reference timing 304. The slew is defined as the draft or shift in pilot timing from the previous mobile pilot reference timing 304.

The draft or shift in pilot timing may be due to a number of factors. For example, the acquisition slew may be caused by slow clock draft error, frequency error, or multipath/fading based on location and terrain. In 406, the mobile device 102 adjusts or shifts a subsequent mobile pilot reference timing (e.g., 304') to be utilized during a subsequent wake-up cycle. The adjustment is made to pre-correct the predicted slew of the pilot timing in the subsequent wake-up cycle. In 408, the mobile device 102 returns to a sleep state to wait for the next wake-up cycle.

Figure 5:
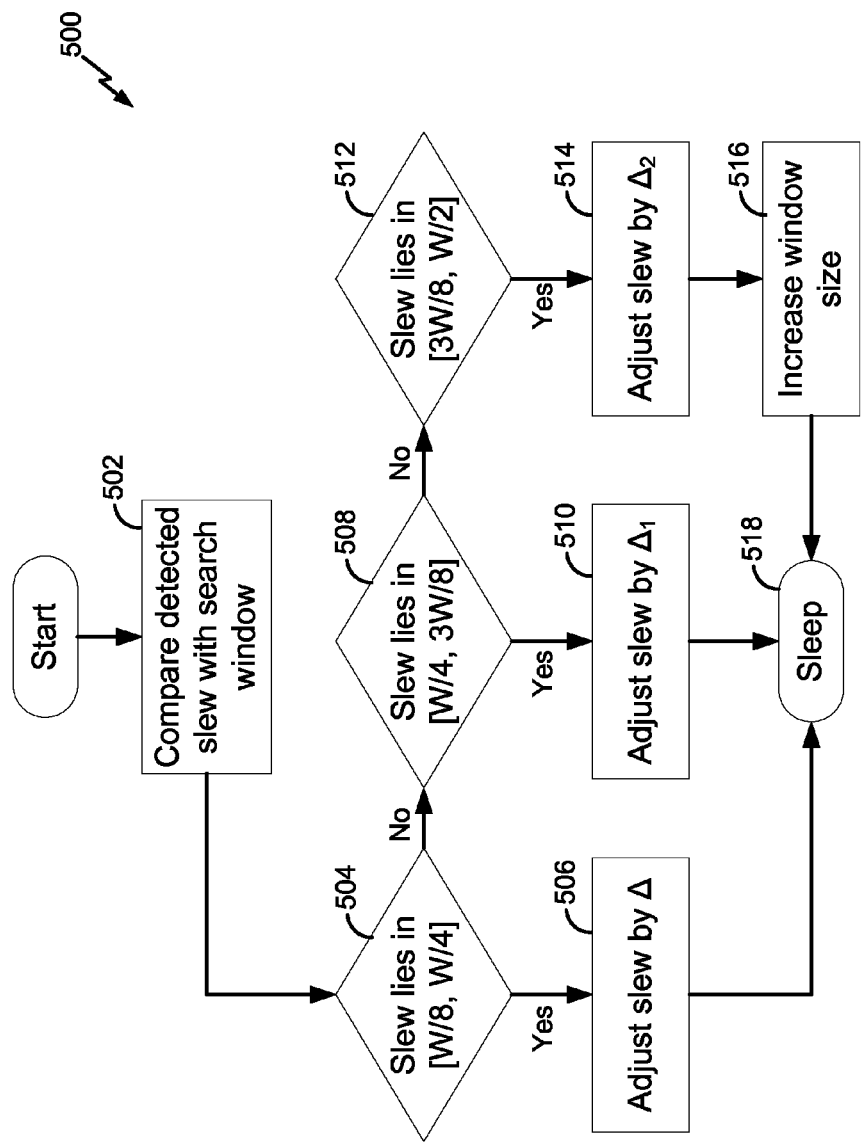
FIG. 5 is a flow chart illustrating the pre-correction of mobile pilot reference timing of FIG. 4 in more detail according to some embodiments.

FIG. 5 is a flow chart 500 illustrating the pre-correction of mobile pilot reference timing of FIG. 4 in more detail according to aspects of the disclosure. The processes and procedures of FIG. 5 may be implemented in 404, 405, and 406 of FIG. 4. In 502, the detected acquisition slew is compared to an active set window (ASW) with an active set window size (ASET_WIN_SIZ). During initial boot-up, a mobile device 102 may set the size of a search window larger than a default window size in order to detect the strongest active pilot paths.

(e.g., Large Window Size=16384 chips, Default Window Size=48 chips) Once the reacquisition slew settles down and falls within a predetermined shift (e.g., ±ASET_WIN_SIZ/ 2), the window size may be changed back to the default window size. In some aspects of the disclosure, pre-correction of the mobile pilot reference timing may not be performed if the reacquisition slew is less than |ASET_WIN_SIZ/8|, for example. That is, the mobile pilot reference timing may not be changed in this case.

Figure 6:
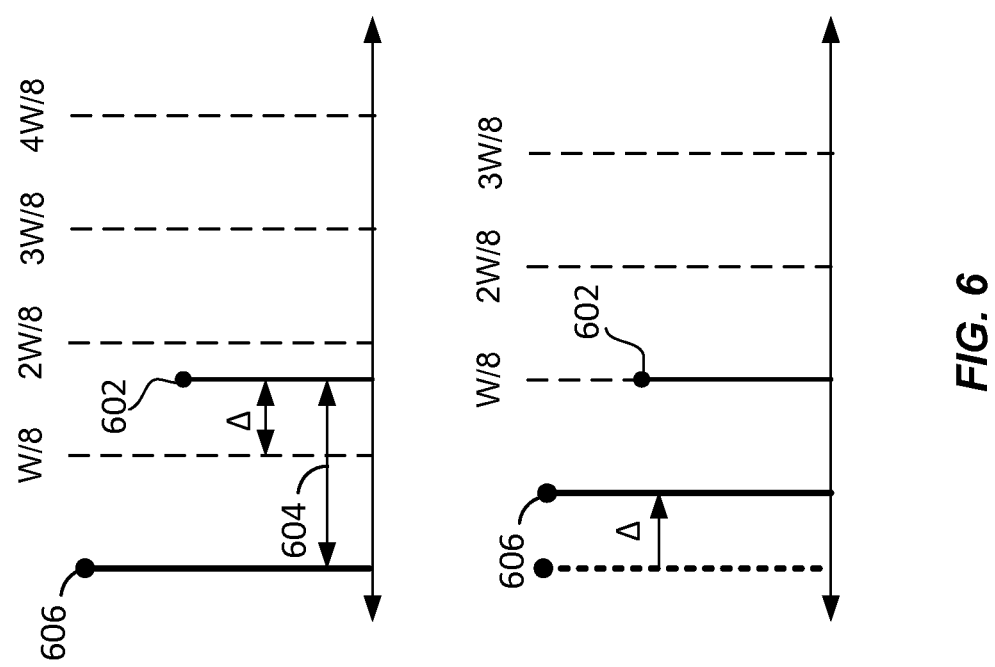
FIGS. 6 through 8 are diagrams conceptually illustrating pre-correction operations of FIG. 5 according to aspects of the disclosure.

Referring to FIG. 5, in 504, if the detected acquisition slew lies between one-eighth (ASET_WIN_SIZ/8) and one-fourth (ASET_WIN_SIZ/4) of the search window, the subsequent mobile pilot reference timing (MPRT) may be adjusted or shifted, in 506, by an amount Δ equal to a difference between the actual pilot timing and one-eighth of the window size (ASET_WIN_SIZ/8). FIG. 6 is a diagram conceptually illustrating the operations in 506 according to one aspect. A pilot timing 602 is detected to be between ASET_WIN_SIZ/8 (W/8) and ASET_WIN_SIZ/4 (2W/8). For example, the pilot timing 602 may correspond to a strongest pilot path position found by a mobile device 102 after wakeup. In this case, the acquisition slew 604 is the shift of the actual pilot timing 602 from the mobile pilot reference time 606. Here, the vector direction of the pilot timing 602 is a positive direction because the detected pilot timing is shifted to the right relative to the mobile pilot reference time 606. In order to pre-correct the predicted slew in the next wake-up slot, the mobile device 102 may be configured to adjust or shift the mobile pilot reference time 606 (or the center of the search window) in the vector direction of the pilot timing 602 by an amount Δ equal to a difference between the actual pilot timing 602 and ASET_WIN_SIZ/8.

$$\Delta = \text{Pilot Timing} - (ASET\_WIN\_SIZ)/8$$

Therefore, the search window, which centers at the pilot reference time 606, is effectively shifted by the same amount Δ.

Figure 7:
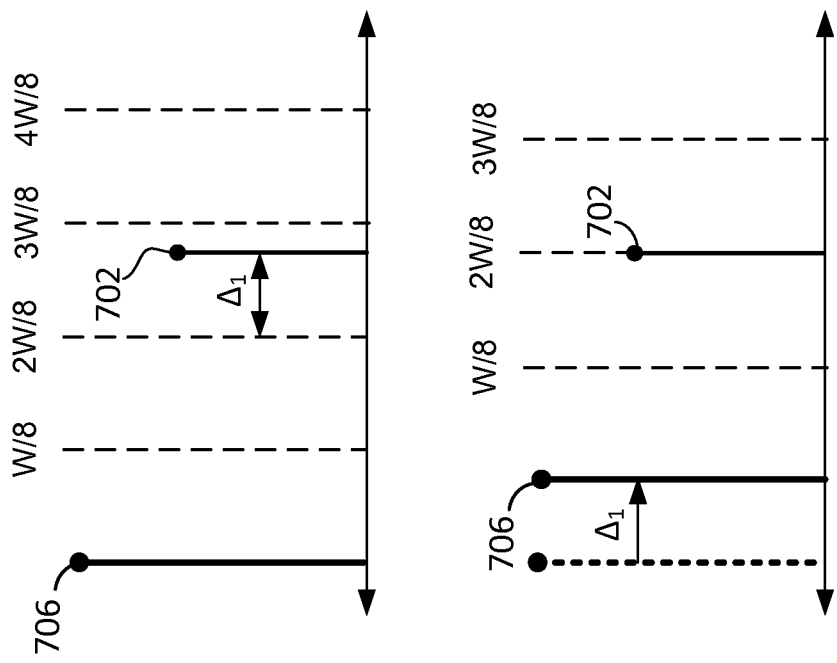

Referring back to FIG. 5, in 508, if the detected acquisition slew lies between one-fourth (ASET_WIN_SIZ/4) and three-eighth (ASET_WIN_SIZ*3/8) of the search window, the subsequent MPRT may be adjusted or shifted, in 510, by an amount $\Delta_1$ equal to a difference between the actual pilot timing and one-fourth of the window size (ASET_WIN_SIZ/ 4). FIG. 7 is a diagram conceptually illustrating the operations in 510 according to one aspect. A pilot timing 702 is detected to be between ASET_WIN_SIZ/4 and ASET_WIN_SIZ*3/8. For example, the pilot timing 702 may correspond to a strongest pilot path position found by the mobile device 102 after wake-up. In order to pre-correct the predicted slew in the next wake-up slot, the mobile device 102 may be configured to adjust or shift a mobile pilot reference time 706 by an amount $\Delta_1$ equal to a difference between the actual pilot timing 702 and ASET_WIN_SIZ/4.

$$\Delta_1 = \text{Pilot Timing} - (ASET\_WIN\_SIZ)/4$$

Therefore, the search window, which centers at the pilot reference time 706, is effectively shifted by the same amount $\Delta_1$.

Figure 8:
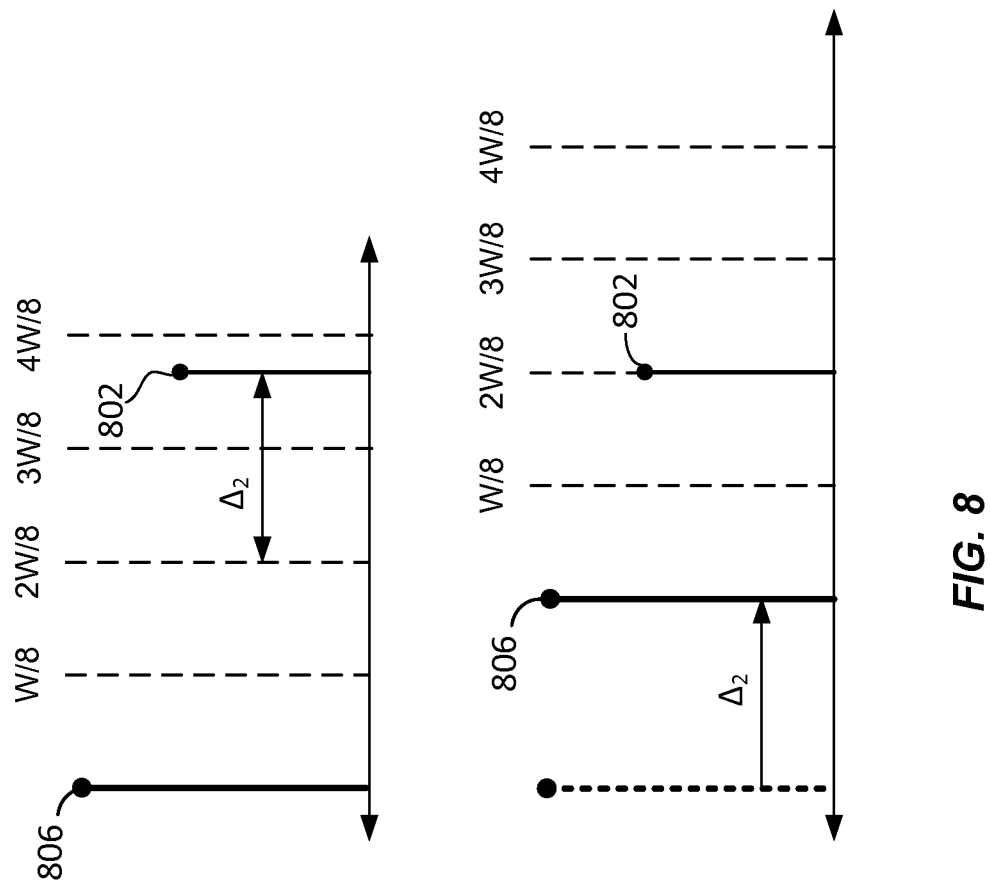

Referring back to FIG. 5, in 512, if the detected acquisition slew lies between three-eighth (ASET_WIN_SIZ*3/8) and one-half (ASET_WIN_SIZ/2) of the search window, the subsequent MPRT may be adjusted or shifted, in 514, by an amount $\Delta_2$ equal to a difference between the actual pilot timing and one-fourth of the window size (ASET_WIN_SIZ/ 4). FIG. 8 is a diagram conceptually illustrating the operations in 514 according to one aspect. In this case, a pilot timing 802 is detected to be between ASET_WIN_SIZ*3/8 and ASET_WIN_SIZ/2. For example, the pilot timing 802 may correspond to a strongest pilot path position found by the mobile device 102 after wake-up. In order to pre-correct the predicted slew in the next wake-up slot, the mobile device 102 may be configured to adjust or shift a mobile pilot reference time 806 (or the center of a search window) by an amount $\Delta_2$ equal to a difference between the actual pilot timing 802 and ASET_WIN_SIZ/4.

$$\Delta_2 = \text{Pilot Timing} - (ASET\_WIN\_SIZ)/4$$

Therefore, the search window, which centers at the pilot reference time 806, is effectively shifted by the same amount $\Delta_2$. Referring back to FIG. 5, in 516, a window size of the search window is increased to ASET_WIN_SIZ+2$\Delta_2$ for searching the pilots when the mobile device 102 wakes up in the next assigned slot. In the subsequent/next wakeup slot, the size of the search window is reduced back to default size. In 518, the mobile device 102 returns to sleep and wait for the next assigned slot to wake-up again.

The above aspects of the disclosure may help to prevent system losses for M2M devices when larger SCI values (e.g., SCI>2) are used. Reducing frequent system losses may improve the power performance of the devices. The algorithm, procedures, and processes described in reference to FIGS. 4 through 8 may not be triggered if pilot change or handoff takes place. In this case, the mobile device may not adjust mobile pilot reference timing (or center of a search window) as described in FIGS. 4 through 8. Although, the examples illustrate the acquisition slew to be moving in a positive direction relative to the pilot reference timing, the disclosure is not limited thereto. In some aspects, the direction of the acquisition slew may be moving in a negative direction relative to the reference timing.

In one configuration, the mobile device 102 includes means for waking up to perform a pilot reacquisition corresponding to a slotted mode; means for detecting a slew of a pilot timing relative to a pilot reference timing; means for adjusting a subsequent pilot reference timing by an amount corresponding to the detected slew, to be utilized during a subsequent wake-up cycle; and means for returning to a sleep state to wait for the subsequent wake-up cycle. In one aspect, the aforementioned means may be the processor 204 in which the invention resides from FIGS. 4-8, configured to perform the functions recited by the aforementioned means. In another aspect, the aforementioned means may be a module or any suitable apparatus configured to perform the functions recited by the aforementioned means.

Several aspects of a telecommunications system have been presented with reference to a CDMA2000 system. As those skilled in the art will readily appreciate, various aspects described throughout this disclosure may be extended to other telecommunication systems, network architectures and communication standards.

By way of example, various aspects may be extended to UMTS systems such as W-CDMA, TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

We claim:

1. A method of wireless communication operable at a mobile device, comprising:
   waking up to perform a pilot reacquisition corresponding to a slotted mode;
   during initial boot up, setting a size of a reacquisition window at a first window size greater than a default window size;
   detecting a slew of a pilot timing relative to a pilot reference timing;
   when the pilot timing is within a predetermined shift from a center of the reacquisition window, reducing the size of the reacquisition window to the default window size;
   adjusting a subsequent pilot reference timing by an amount corresponding to the detected slew, to be utilized during a subsequent wake-up cycle; and
   returning to a sleep state to wait for the subsequent wake-up cycle.

2. The method of claim 1, further comprising:
   waking up for the subsequent wake-up cycle; and
   utilizing the subsequent pilot reference timing for a reacquisition window.

3. The method of claim 1, wherein the adjusting the subsequent pilot reference timing comprises shifting the subsequent pilot reference timing to reduce a predicted slew in the subsequent wake-up cycle.

4. The method of claim 3, wherein the shifting the subsequent pilot reference timing comprises shifting the subsequent pilot reference timing in a vector direction of the detected slew.

5. The method of claim 1, wherein if the pilot timing is shifted from a center of a reacquisition window less than one-eighth the size of the reacquisition window, the adjusting the subsequent pilot reference timing comprises not changing the subsequent pilot reference timing.

6. The method of claim 1, wherein if the pilot timing is shifted from a center of a reacquisition window between one-eighth and one-fourth of a reacquisition window size, the adjusting the subsequent pilot reference timing comprises shifting the subsequent pilot reference timing by an amount equal to a difference between the subsequent pilot reference timing and one-eighth of the reacquisition window size.

7. The method of claim 1, wherein if the pilot timing is shifted from a center of a reacquisition window between one-fourth and three-eighth of a reacquisition window size, the adjusting the subsequent pilot reference timing comprises shifting the subsequent pilot reference timing by an amount equal to a difference between the subsequent pilot reference timing and one-fourth of the reacquisition window size.

8. The method of claim 1, wherein if the pilot timing is shifted from a center of a reacquisition window between three-eighth and one-half of a reacquisition window size, the adjusting the subsequent pilot reference timing comprises:
   shifting the subsequent pilot reference timing by an amount equal to a difference between the subsequent pilot reference timing and one-fourth of the reacquisition window size; and
   increasing the reacquisition window size by the amount equal to the difference between the subsequent pilot reference timing and one-fourth of the reacquisition window size.

9. The method of claim 1, wherein if a pilot change or handoff occurs, the adjusting the subsequent pilot reference timing comprises not changing the subsequent pilot reference timing.

10. An apparatus for wireless communication, comprising:
    means for waking up to perform a pilot reacquisition corresponding to a slotted mode;
    during initial boot up, means for setting a size of a reacquisition window at a first window size greater than a default window size;
    means for detecting a slew of a pilot timing relative to a pilot reference timing;
    means for when the pilot timing is within a predetermined shift from a center of the reacquisition window, reducing the size of the reacquisition window to the default window size;
    means for adjusting a subsequent pilot reference timing by an amount corresponding to the detected slew, to be utilized during a subsequent wake-up cycle; and
    means for returning to a sleep state to wait for the subsequent wake-up cycle.

11. The apparatus of claim 10, further comprising:
    means for waking up for the subsequent wake-up cycle; and
    means for utilizing the subsequent pilot reference timing for a reacquisition window.

12. The apparatus of claim 10, wherein the means for adjusting the subsequent pilot reference timing comprises means for shifting the subsequent pilot reference timing to reduce a predicted slew in the subsequent wake-up cycle.

13. The apparatus of claim 12, wherein the means for shifting the subsequent pilot reference timing comprises means for shifting the subsequent pilot reference timing a vector direction of the detected slew.

14. The apparatus of claim 10, wherein if the pilot timing is shifted from a center of a reacquisition window less than one-eighth the size of the reacquisition window, the means for adjusting the subsequent pilot reference timing is configured not to change the subsequent pilot reference timing.

15. The apparatus of claim 10, wherein if the pilot timing is shifted from a center of a reacquisition window between one-eighth and one-fourth of a reacquisition window size, the means for adjusting the subsequent pilot reference timing comprises means for shifting the subsequent pilot reference timing by an amount equal to a difference between the subsequent pilot reference timing and one-eighth of the reacquisition window size.

16. The apparatus of claim 10, wherein if the pilot timing is shifted from a center of a reacquisition window between one-fourth and three-eighth of a reacquisition window size, the means for adjusting the subsequent pilot reference timing comprises means for shifting the subsequent pilot reference timing by an amount equal to a difference between the subsequent pilot reference timing and one-fourth of the reacquisition window size.

17. The apparatus of claim 10, wherein if the pilot timing is shifted from a center of a reacquisition window between three-eighth and one-half of a reacquisition window size, the means for adjusting the subsequent pilot reference timing comprises:
   means for shifting the subsequent pilot reference timing by an amount equal to a difference between the subsequent pilot reference timing and one-fourth of the reacquisition window size; and
   means for increasing the reacquisition window size by the amount equal to the difference between the subsequent pilot reference timing and one-fourth of the reacquisition window size.

18. The apparatus of claim 10, wherein if a pilot change or handoff occurs, the adjusting the subsequent pilot reference timing comprises not changing the subsequent pilot reference timing.

19. A computer program product, comprising:
   a non-transitory computer-readable storage medium comprising code for causing a mobile device to:
   wake up to perform a pilot reacquisition corresponding to a slotted mode;
   during initial boot up, set a size of a reacquisition window at a first window size greater than a default window size;
   detect a slew of a pilot timing relative to a pilot reference timing;
   when the pilot timing is within a predetermined shift from a center of the reacquisition window, reduce the window size of the reacquisition window to the default window size;
   adjust a subsequent pilot reference timing by an amount corresponding to the detected slew, to be utilized during a subsequent wake-up cycle; and
   return to a sleep state to wait for the subsequent wake-up cycle.

20. The computer program product of claim 19, wherein the computer-readable storage medium further comprises code for causing the mobile device to:
   wake up for the subsequent wake-up cycle; and
   utilize the subsequent pilot reference timing for a reacquisition window.

21. The computer program product of claim 19, wherein the code for causing the mobile device to adjust the subsequent pilot reference timing, comprises code for causing the mobile device to shift the subsequent pilot reference timing to reduce a predicted slew in the subsequent wake-up cycle.

22. The computer program product of claim 21, wherein the code for causing the mobile device to shift the subsequent pilot reference timing, comprises code for causing the mobile device to shift the subsequent pilot reference timing in a vector direction of the detected slew.

23. The computer program product of claim 19, wherein if the pilot timing is shifted from a center of a reacquisition window less than one-eighth the size of the reacquisition window, the code for causing the mobile device to adjust the subsequent pilot reference timing comprises code for causing the mobile device not to change the subsequent pilot reference timing.

24. The computer program product of claim 19, wherein if the pilot timing is shifted from a center of a reacquisition window between one-eighth and one-fourth of a reacquisition window size, the code for causing the mobile device to adjust the subsequent pilot reference timing comprises code for causing the mobile device to shift the subsequent pilot reference timing by an amount equal to a difference between the subsequent pilot reference timing and one-eighth of the reacquisition window size.

25. The computer program product of claim 19, wherein if the pilot timing is shifted from a center of a reacquisition window between one-fourth and three-eighth of a reacquisition window size, the code for causing the mobile device to adjust the subsequent pilot reference timing comprises code for causing the mobile device to shift the subsequent pilot reference timing by an amount equal to a difference between the subsequent pilot reference timing and one-fourth of the reacquisition window size.

26. The computer program product of claim 19, wherein if the pilot timing is shifted from a center of a reacquisition window between three-eighth and one-half of a reacquisition window size, the code for causing the mobile device to adjust the subsequent pilot reference timing comprises code for causing the mobile device to:
   shift the subsequent pilot reference timing by an amount equal to a difference between the subsequent pilot reference timing and one-fourth of the reacquisition window size; and
   increase the reacquisition window size by the amount equal to the difference between the subsequent pilot reference timing and one-fourth of the reacquisition window size.

27. The computer program product of claim 19, wherein if a pilot change or handoff occurs, the code for causing the mobile device to adjust the subsequent pilot reference timing comprises code for causing the mobile device not to change the subsequent pilot reference timing.

28. An apparatus for wireless communication, comprising:
   at least one processor;
   a communication interface coupled to the at least one processor; and
   a memory coupled to the at least one processor,
   wherein the at least one processor is configured to:
   wake up to perform a pilot reacquisition corresponding to a slotted mode;
   during initial boot up, set a size of a reacquisition window at a first window size greater than a default window size;
   detect a slew of a pilot timing relative to a pilot reference timing;
   when the pilot timing is within a predetermined shift from a center of the reacquisition window, reduce the window size of the reacquisition window to the default window size;
   adjust a subsequent pilot reference timing by an amount corresponding to the detected slew, to be utilized during a subsequent wake-up cycle; and
   return to a sleep state to wait for the subsequent wake-up cycle.

29. The apparatus of claim 28, wherein the at least one processor is configured to:
wake up for the subsequent wake-up cycle; and
utilize the subsequent pilot reference timing for a reacquisition window.

30. The apparatus of claim 28, wherein the at least one processor is further configured to adjust the subsequent pilot reference timing to reduce a predicted slew in the subsequent wake-up cycle.

31. The apparatus of claim 30, wherein the at least one processor is further configured to shift the subsequent pilot reference timing in a vector direction of the detected slew.

32. The apparatus of claim 28, wherein if the pilot timing is shifted from a center of a reacquisition window less than one-eighth the size of the reacquisition window, the at least one processor is further configured not to change the subsequent pilot reference timing.

33. The apparatus of claim 28, wherein if the pilot timing is shifted from a center of a reacquisition window between one-eighth and one-fourth of a reacquisition window size, the at least one processor is further configured to shift the subsequent pilot reference timing by an amount equal to a difference between the subsequent pilot reference timing and one-eighth of the reacquisition window size.

34. The apparatus of claim 28, wherein if the pilot timing is shifted from a center of a reacquisition window between one-fourth and three-eighth of a reacquisition window size, the at least one processor is further configured to shift the subsequent pilot reference timing by an amount equal to a difference between the subsequent pilot reference timing and one-fourth of the reacquisition window size.

35. The apparatus of claim 28, wherein if the pilot timing is shifted from a center of a reacquisition window between three-eighth and one-half of a reacquisition window size, the at least one processor is further configured to:
shift the subsequent pilot reference timing by an amount equal to a difference between the subsequent pilot reference timing and one-fourth of the reacquisition window size; and
increase the reacquisition window size by the amount equal to the difference between the subsequent pilot reference timing and one-fourth of the reacquisition window size.

36. The apparatus of claim 28, wherein if a pilot change or handoff occurs, the at least one processor is further configured not to change the subsequent pilot reference timing.

\* \* \* \* \*